UNITED STATES PATENT OFFICE 2,415,366

POLYMERIZABLE DIESTER COMPOUNDS AND METHOD OF MAKING SAME

Irving E. Muskat, Glenside, Pa., assignor to Marco Chemicals, Inc., a corporation of New Jersey No Drawing. Application January 16, 1943, Serial No. 472,618

16 Claims. (Cl. 260—77)

This invention is directed to new compositions of matter and to polymers thereof. In accordance with the present invention I have discovered new polymerizable mixed esters of a monohydric and polyhydric alcohol and an unsaturated polycarboxylic acid preferably an alpha beta dicarboxylic unsaturated acid. The esters may be regarded as esters of (a) a polyhydric alcohol such as ethylene glycol, diethylene glycol, triethylene glycol, tetraethylene glycol, propylene glycol, the polypropylene glycols, butylene glycol and polyglycol, trimethylene glycol, pentamethylene glycol, glycerol, phthalyl alcohol, alpha methyl glycerol, pinacol, mannitol, etc., including the diol resorcinol, and (b) an acid ester of fumaric acid or similar unsaturated acid and a saturated monohydric alcohol such as methyl, ethyl, propyl, isopropyl, butyl, tertiary butyl, amyl, lauryl, hexyl, octyl, stearyl, benzyl, napththyl alcohols, or halogen substituted alcohols such as beta chloroethyl alcohol, propylene chlorohydrin, etc. Moreover esters of polyhydric alcohols such as glycol, diethylene glycol, dipropylene glycol, propylene glycol, etc. wherein but a single hydroxy group is esterified with the fumaric acid may be prepared such as diethylene glycol bis (hydroxyethyl fumarate). Of particular interest are the esters of lower saturated alcohols containing 1 to 8 carbon atoms, especially those containing 1 to 5 carbon atoms, and of the lower alkylene glycols containing 2 to 4 carbon atoms. Esters of the polyglycols of such glycols are especially desirable compounds.

The esters contemplated are polyesters in which at least two hydroxy groups of the polyhydric alcohol are esterified with the acid ester above mentioned. These compounds may be prepared by any convenient method such as by ester interchange from the corresponding saturated alcohol diester. For example, a dialkyl ester of fumaric acid, such as diethyl fumarate, may be heated with a polyhydric alcohol such as ethylene glycol or diethylene glycol, in the proportion of about 2 moles of ester per mole of glycol and, if desired, in the presence of an ester interchange catalyst such as sodium methylate, paratoluene sulphonic acid or other effective acid, alkaline or neutral catalyst.

These new esters are in general viscous, colorless liquids, although they may, in some cases, be solids generally of low melting point. They contain one radical derived from the polyhydric alcohol and two or more radicals derived from the acid ester. Many of them have the following structural formula:

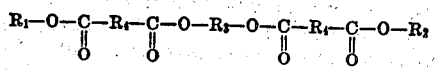

wherein $R_1$ and $R_2$ are members of the group consisting of saturated hydrocarbon radicals and halogen substituted saturated hydrocarbon radicals derived from a saturated monohydric alcohol, $R_3$ is a radical of a polyhydric alcohol containing no more than 6 hydroxyl groups and having no other reactive groups than the hydroxyl groups, and $R_4$ is a bivalent aliphatic hydrocarbon radical containing an unsaturated carbon to carbon linkage, one of said carbon atoms being linked directly to a carboxyl radical. Where these new esters are derived from a preferred glycol in accordance with the present invention, $R_3$ is a radical of an alkylene glycol having from 2 to 4 carbon atoms in the molecule. Preferably these esters are neutral and do not contain free acid groups, and in many cases these esters contain no free hydroxyl groups, although the presence of such groups may not be objectionable except where water solubility of the ester is undesirable.

The polyesters herein contemplated polymerize to form a variety of polymers having desirable properties. The esters of fumaric acid are especially active and polymerize to form clear, tough, hard polymers. This polymerization is effected by means of heat and/or light and in the presence of catalysts, such as benzoyl peroxide, or ethyl or isopropyl peroxycarbonate or other peroxycarbonate.

The nature of the polymers may be varied considerably in accordance with the properties desired. Upon initial polymerization of a liquid ester or a solution of an ester, the ester or solution thickens to a syrupy consistency. This syrup is a solution of soluble fusible polymer in monomer and/or solvent.

If desired, the fusible polymer may be precipitated from the syrupy solution by addition of a nonsolvent such as water, methyl or ethyl alcohol, glycol, etc. This fusible polymer may be fused, shaped, and further polymerized to a thermosetting, substantially insoluble state with the aid of peroxide polymerization catalysts. Alternatively it may be dissolved in a solvent such as xylene, toluene, acetone, benzene or dioxane and used as a coating composition to form coatings or films which may be further polymerized to a thermosetting state.

If polymerization is continued after the monomer thickens, a gel is formed which is usually quite fragile. This gel usually contains a substantial quantity of soluble polymerizable material and also a substantial quantity of polymer which will not dissolve in organic solvents to an appreciable degree. This gel may be further polymerized to a thermosetting state. For example, it may be ground to form a powder and subjected to sufficient heat and pressure in the presence of a polymerizatoin catalyst to fuse the gel particles and further polymerize the product to a substantially infusible state. Alternatively sheets or rods of the ester polymerized to a gel state may be bent or otherwise shaped and polymerized while retaining the gel fracture-free and in the shape imparted thereto.

Cast polymers of various shapes, including sheets, rods, etc., may be prepared by polymerization of the ester directly to the final stage in which it is substantially insoluble and infusible. This may be done by polymerizing the ester in a casting cell comprising a pair of glass or metal sheets separated by a flexible elastic separator such as a gasket of rubber, polyvinyl chloride plastic such as "Koroseal", polyisobutylene, polychloroprene, etc., the entire assembly being clamped together by suitable means. In order to minimize fracturing, it is often desirable to coat the glass or metal surfaces of the cell with a solid, waxlike lubricant such as zinc stearate.

Laminated products may be prepared by impregnating a plurality of layers of fibrous material such as leather, paper, woven or felted glass fiber or mineral wool, muslin, duck, canvas, or other cotton or wool fabrics, linen, etc. with the ester containing a suitable polymerization catalyst such as benzoyl peroxide. The impregnated sheets may then be placed between a pair of glass or metal plates and heated at a suitable temperature, for example, 50 to 110° C., to polymerize the sheet.

The esters herein contemplated may be polymerized with other polymerizable unsaturated materials such as vinyl chloride, vinyl acetate, butadiene 1,3; beta chlorobutadiene 1,3; the acrylic or alpha substituted acrylic acid esters nitriles or amides including methyl, ethyl, butyl, allyl, crotyl or methallyl acrylate, alpha chloroacrylate, methacrylate, etc. glycol dimethacrylate glycerol di- or tri-methacrylate, glycol diacrylate, acrylonitrile etc. or other polymerizable materials including allyl, methallyl, vinyl, isopropenyl, crotyl or other unsaturated esters of polybasic acids such as phthalic, maleic, oxalic, carbonic, citric, tartaric, succinic, adipic or fumaric acids or the esters of the above unsaturated alcohols and unsaturated acids such as cinnamic or crotonic acids or esters of (a) a polyhydric alcohol and (b) an acid ester of a polybasic acid and an unsaturated alcohol such as ethylene glycol bis (allyl carbonate) or other compound described in copending application filed by Franklin Strain and Irving E. Muskat, Serial No. 403,703, filed July 23, 1941. The following examples are illustrative.

Example 1

The following materials were placed into a 5 liter, round bottom, flask equipped with a mercury-sealed stirrer, Vigreaux column, delivery table for illuminating gas, and a thermometer, 1800 g. (12.5 moles) of dimethyl fumarate
23.3 g. of paratoluene sulphonic acid monohydrate
2.33 g. of hydroquinone.

The flask was heated to a temperature of 170–180° C., until the methyl fumarate melted. Stirring was begun and diethylene glycol (5 moles, 530 g.) added at the rate of 1 drop every 2 seconds. The internal temperature remained at 160–170° C. during the addition of the glycol. During the reaction, methanol distilled through the Vigreaux column. When all of the diethylene glycol had been added, the bath temperature was raised to 180–190° C. and illuminating gas was bubbled through the reaction mixture to complete the removal of methanol. The reaction was carried on over a period of 12 hours.

The hot reaction mixture was mixed with 1 liter of $CCl_4$ and the hot $CCl_4$ solution was allowed to cool. Excess methyl fumarate separated as white crystals, was filtered and washed several times with $CCl_4$. The filtrate, containing diethylene glycol bis (methyl fumarate) was washed once with 1.0 liter of water, twice with 1.0 liter portions of 5% NaOH, whereby the product was neutralized, and once with 1.0 liter of water.

The washed ester was decolorized with decolorizing carbon and heated "in vacuo" until approximately 500 cc of $CCl_4$ were collected. The residue was filtered and purified by topping to remove volatile impurities by heating at 170° C. for several hours under a pressure of 3.0 mm. of mercury. The topped material was an amber colored, high boiling liquid. Upon distillation, a purified sample of the ester was secured. This ester is a solid which melts at about 62° C. and which is soluble in carbon tetrachloride and ether. It distills at about 170–185° C. at 1 to 2 mm. pressure and has the following structure:

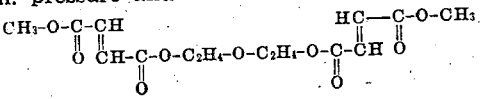

A quantity of the ester containing one percent benzoyl peroxide was heated according to the following cycle:

|   | ° C. |
|---|---|
| 1 hour | 80 |
| 1 hour | 85 |
| 1 hour | 90 |
| 1 hour | 95 |
| 2 hours | 115 |

The resulting product was a hard, transparent, infusible polymer and possessed a Barcol hardness of 48.

Example 2

A mixture of 14.4 moles of diethyl fumarate containing 1 percent paratoluene sulphonic acid and 0.1 percent of hydroquinone was placed in a flask and illuminating gas bubbled therethru to establish an inert atmosphere within the flask. This mixture was heated to 160° C. and 5 moles of diethylene glycol slowly added over a period of 15 hours while maintaining the temperature at 160 to 170° C. The heating was then continued for two hours at a temperature of 200° C. and the reaction mixture washed and topped as in Example 1.

The ester, diethylene glycol bis (ethyl fumarate), thus obtained is a colorless liquid distilling at about 230 to 240° C. under a pressure of 1.5 mm. of mercury and having a density of about 1.200 at 17° C.

This ester has the following probable formula:

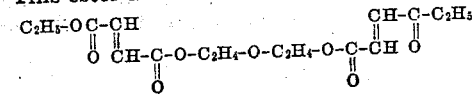

A quantity of this ester containing 1 percent benzoyl peroxide polymerized to a soft gel upon heating at 70° C. for 15 minutes. A quantity of the ester containing 2 percent benzoyl peroxide was heated according to the cycle of Example 1 and a hard, transparent resin, having a Barcol hardness of 35 was secured. This polymer was substantially infusible and insoluble in organic solvents.

A quantity of the ester free from peroxide polymerized upon heating for 17 hours in air at 150° C.

*Example 3*

The process of Example 2 was repeated using dibutyl fumarate in lieu of the diethyl fumarate. The ester thus obtained is an amber, viscous, clear, high boiling liquid having a density of 1.131 at 19° C. This ester has the following probable formula:

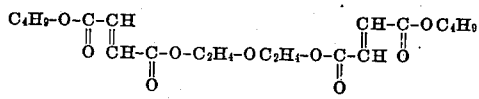

This material polymerizes to a soft gel when heated in the presence of 3 to 5 percent benzoyl peroxide according to the cycle of Example 1.

*Example 4*

The process of Example 2 was repeated using ethylene glycol in lieu of diethylene glycol.

The ester thus obtained is a colorless liquid distilling at 210 to 220° C. under a pressure of 2 mm. of mercury and having a density of about 1.207 at 21° C.

This ester has the following probable formula:

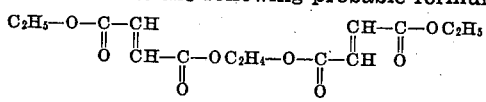

This material polymerizes to a brittle, infusible polymer having a Barcol hardness of about 40 when heated in the presence of 4 percent benzoyl peroxide according to the cycle of Example 1.

*Example 5*

The process of Example 1 was repeated using ethylene glycol in lieu of diethylene glycol.

The ester thus obtained is ethylene glycol bis (methyl fumarate), a crystalline solid.

This material polymerized rapidly to form a hard, brittle polymer by heating in the presence of 0.5 percent benzoyl peroxide according to the cycle of Example 1 to form a hard, tough, transparent polymer.

Other esters, including the corresponding triethylene glycol and glycerol esters may be prepared in similar manner. Generally speaking, the methyl esters are commonly solids, while the other esters are usually high boiling and occasionally somewhat viscous esters.

The methyl and ethyl esters polymerize rapidly to form hard, tough polymers. Usually the esters of higher alcohols, including butyl alcohol, polymerize to form softer polymers. The following examples illustrate the copolymerization of these materials with other polymerizable materials.

*Example 6*

A mixture of 20 percent by weight of styrene and 80 percent by weight of diethylene glycol bis (methyl fumarate) and containing 5% benzoyl peroxide based upon the weight of the mixture was heated at 65° C. After 15 minutes heating the mixture polymerized to form a hard, unfractured polymer.

*Example 7*

A mixture of 20 percent by weight of vinyl acetate and 80 percent by weight of diethylene glycol bis (methyl fumarate) and containing 0.5 percent benzoyl peroxide, based upon the weight of the mixture, was heated at 65° C. for 14 hours. Thereafter the temperature was gradually raised to 115° C. over a period of 10 hours. A hard, unfractured, transparent polymer was obtained.

Numerous other copolymers have been obtained by polymerizing mixtures containing styrene and vinyl acetate and the new esters herein described in the manner described above. It is found that these materials are miscible in practically all proportions and polymerize to form clear, transparent polymers.

While the present invention has been described with reference to esters of fumaric acid, the corresponding esters of other unsaturated polybasic acids, particularly alpha beta unsaturated, and such as maleic, itaconic, citraconic, mesaconic, acetylene dicarboxylic, dimethyl maleic, ethyl maleic or propylene 1,2,3 tricarboxylic acids may be prepared and polymerized as herein described.

The expressions "having no other reactive group than the hydroxyl group" and "having no other reactive groups than the hydroxyl groups" used in the claims, signify as to the alcohols referred to that the only groups or radicals thereof which are reactive to form the compounds of the present invention are the hydroxyl groups.

Although the present invention has been described with reference to the specific details of certain embodiments thereof, it is not intended that such details shall be regarded as limitations on the scope of the invention except in so far as included in the accompanying claim.

I claim:

1. Diethylene glycol bis (methyl fumarate).
2. Diethylene glycol bis (ethyl fumarate).
3. Ethylene glycol bis (ethyl fumarate).
4. A polymer of diethylene glycol bis (methyl fumarate).
5. A polymer of diethylene glycol bis (ethyl fumarate).
6. A polymer of ethylene glycol bis (ethyl fumarate).
7. A method which comprises reacting a polyhydric alcohol containing no more than 6 hydroxyl groups and having no other reactive groups than the hydroxyl groups with a diester of an alpha beta unsaturated dicarboxylic acid and a saturated monohydric alcohol having no other reactive group than the hydroxyl group in the approximate proportion of one mole of polyhydric alcohol and two moles of diester to form the polyester of (a) the polyhydric alcohol and (b) an acid ester of the saturated alcohol and the dibasic acid in which at least two of the hydroxyl groups of the polyhydric alcohol are esterified with the acid ester.
8. The method of preparing polymerizable diester compounds comprising heating a polyhydric alcohol containing no more than 6 hydroxyl groups and having no other reactive groups than the hydroxyl groups with a diester of an alpha beta unsaturated dicarboxylic acid and a saturated monohydric alcohol having no other reactive group than the hydroxyl group in the presence of an ester interchange catalyst and in the approximate proportion of one mole of polyhydric alcohol and two moles of diester.

9. The method of preparing polymerizable diester compounds comprising heating an alkylene glycol having from 2 to 4 carbon atoms in the molecule with a diester of an alpha beta unsaturated dicarboxylic acid and a saturated monohydric alcohol having no other reactive group than the hydroxyl group in the presence of an ester interchange catalyst and in the approximate proportion of one mole of glycol and two moles of diester.

10. The method of preparing polymerizable diester compounds comprising heating an alkylene glycol having from 2 to 4 carbon atoms in the molecule with a diester of an alpha beta unsaturated dicarboxylic acid and a saturated monohydric alcohol containing no more than 5 carbon atoms and having no other reactive group than the hydroxyl group in the presence of an ester interchange catalyst and in the approximate proportion of one mole or glycol and two moles of diester.

11. The method of preparing polymerizable diester compounds comprising heating an alkylene glycol having from 2 to 4 carbon atoms in the molecule with a diester of an alpha beta unsaturated dicarboxylic acid and a saturated monohydric alcohol having no other reactive group than the hydroxyl group in the approximate proportion of one mole of glycol and two moles of diester.

12. A resinous polymer of the diester claimed in claim 13.

13. The polymerizable, water-insoluble diester compound of the following general formula

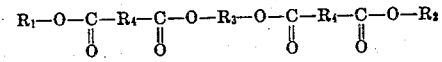

wherein $R_1$ and $R_2$ are members of the group consisting of saturated hydrocarbon radicals and halogen substituted saturated hydrocarbon radicals derived from a saturated monohydric alcohol, $R_3$ is a radical of an alkylene glycol having from 2 to 4 carbon atoms in the molecule, and $R_4$ is a bivalent aliphatic hydrocarbon radical containing an unsaturated carbon to carbon linkage, one of said carbon atoms being linked directly to a carboxyl radical.

14. The method of preparing polymerizable diester compounds comprising reacting under the influence of heat an alkylene glycol having from 2 to 4 carbon atoms in the molecule with a diester of an alpha beta unsaturated dicarboxylic acid and a saturated monohydric alcohol containing no more than 5 carbon atoms and having no other reactive group than the hydroxyl group in the presence of an ester interchange catalyst, the molar ratio of said diester reacted with said glycol being in the approximate proportion of 2 to 1.

15. The method of preparing polyfunctional polymerizable diester compounds comprising reacting under the influence of heat an alkylene glycol having from 2 to 4 carbon atoms in the molecule with a diester of an alpha beta unsaturated dicarboxylic acid and a saturated monohydric alcohol containing no more than 5 carbon atoms and having no other reactive group than the hydroxyl group, in the presence of an ester interchange catalyst, and removing the monohydric alcohol formed by the reaction from the hot reaction mixture, the molar ratio of alkylene glycol so reacted with the heated diester being in the approximate proportion of 1 to 2.

16. The method of preparing polyfunctional polymerizable diester compounds comprising reacting under the influence of heat an alkylene glycol having from 2 to 4 carbon atoms in the molecule with a diester of an alpha beta unsaturated dicarboxylic acid and a saturated monohydric alcohol containing no more than 5 carbon atoms and having no other reactive group than the hydroxyl group, in the presence of an ester interchange catalyst, removing the monohydric alcohol formed by the reaction from the hot reaction mixture, the molar ratio of alkylene glycol so reacted with the heated diester being in the approximate proportion of 1 to 2, thereby forming the said polyfunctional polymerizable compound, and separating the said compound from the reaction mixture.

IRVING E. MUSKAT.

REFERENCES CITED

The following references are of record in the file of this patent:

UNITED STATES PATENTS

| Number | Name | Date |
|---|---|---|
| 2,295,165 | De Groote et al. | Sept. 8, 1942 |
| 2,328,062 | De Groote et al. | Aug. 31, 1943 |
| 2,319,575 | Agens | May 18, 1943 |
| 2,094,947 | Humphrey | Oct. 5, 1937 |
| 1,938,791 | Arsem | Dec. 12, 1933 |
| 1,921,756 | Kienle | Aug. 8, 1933 |

FOREIGN PATENTS

| Number | Country | Date |
|---|---|---|
| 299,424 | British | Mar. 19, 1930 |

OTHER REFERENCES

Carothers-Collected Papers, pg. 28, 1940.